United States Patent Office 3,792,173
Patented Feb. 12, 1974

3,792,173
PROCESS OF REDUCING SHRINKAGE AND RETAINING MOISTURE AND JUICES IN MEAT PRODUCTS AND PRODUCTS PRODUCED THEREBY
Elmer F. Glabe, Chicago, Ill., assignor to Food Technology, Inc., Chicago, Ill.
No Drawing. Filed Dec. 22, 1971, Ser. No. 211,033
Int. Cl. A22c 11/00, 18/00
U.S. Cl. 426—92   11 Claims

ABSTRACT OF THE DISCLOSURE

Shrinkage of meat products is reduced and moisture and juices are retained by coating meat products with a powder consisting essentially of a dehydrated mixture of a sugary syrup, in which the solids are mainly monosaccharides or both mono- and disaccharides, with or without minor amounts of higher saccharides, and a partially gelatinized starch of a type having a gelatinization temperature of at least 150° F. The resultant meat products, upon cooking, not only lose less weight but also have a softer texture and an improved flavor due to greater retention of the natural juices. The invention is especially useful for comminuted meats, for example, sausages, hamburger, frankfurters, and meat loaves, but is also applicable to integral meat units in which the meat has not been comminuted.

BACKGROUND

It is well known that meat products, especially comminuted meat products such as sausages, frankfurters and hamburger tend to shrink and lose their meat juices when cooked. At the same time the softness of the texture is destroyed.

Various methods of cooking meat products have been employed in which a coating of flour has been applied and the coated meat product fried in an open pan or deep fried. This procedure, however, does not necessarily prevent shrinkage of the meat product and the particular type of coating which is relatively thick is applicable only to certain types of meat products. For example, it cannot ordinarily be used for sausages, frankfurters or hamburger and when it is used, it alters the general characteristics of the resultant product. In the cooking of ham, it has been customary to apply brown sugar which alters the flavor but does not prevent shrinkage or enhance retention of moisture or juices.

It would be desirable to provide a method of treating meat products so that shrinkage is reduced and moisture and juices are retained when such products are cooked.

OBJECTS

One of the objects of the present invention is to provide a new and improved way of processing meat products so that shrinkage is reduced and moisture and juices are retained when such products are cooked.

A further object of the invention is to provide a process of the type described wherein meat products, upon cooking, not only lose less weight but also have a softer texture and an improved flavor due to greater retention of the natural juices.

Another object of the invention is to provide a process of the type described which is applicable to comminuted meats, for example, sausages, hamburger, frankfurters and meat loaves, as well as to integral meat units in which the meat has not been comminuted, without converting such meat products into an entirely different type of meat product. Other objects will appear hereinafter.

BRIEF SUMMARY OF THE INVENTION

In accordance with the invention it has been found that shrinkage of meat products upon cooking can be reduced and moisture and juices can be retained by coating meat products with a powder consisting essentially of a dehydrated mixture of a sugary syrup, in which the solids are mainly monosaccharides or both mono- and disaccharides, with or without minor amounts of higher saccharides, and a partially gelatinized starch of a type having a gelatinization temperature of at least 150° F. The invention is applicable to both comminuted meat products and integral meat units, especially to comminuted meat products including sausages, hamburger, frankfurters and meat loaves.

DETAILED DESCRIPTION OF THE INVENTION

Sugary syrups in which the solids are mainly mono- and/or disaccharides are well kown and include, for example, honey, molasses, malt, maple, glucose, high fructose corn syrup and other commercially available sugar syrups. These syrups can also contain minor amounts, usually not more than 40% by weight of higher saccharides. Sugary syrups in which the solids content is solely sucrose are unsuitable for the practice of the invention. Combinations of the aforesaid sugary syrups can also be used. A particularly suitable combination is one composed of high fructose corn syrup and honey.

The term "high fructose corn syrup" as used herein refers to a corn syrup in which the solids content is a minimum of at least 40% by weight fructose (levulose), at least 40% by weight dextrose and the remainder higher saccharides, chiefly maltose. The mineral content can vary but is usually about 0.05% by weight. A typical high fructose corn syrup contains 29.0% water and 71% solids. The solids consist essentially of 42% fructose, 50.0% dextrose and 8.0% higher saccharides, chiefly maltose.

Honey has the following composition (average of 490 samples of liquid honey Table I, page 11, "Composition of American Honey," United States Department of Agriculture Research Technical Bulletin IM-2b):

|  | Percent by weight | |
|---|---|---|
|  | Normal moisture basis | Solids calculated to a dry basis |
| Water | 17.200 |  |
| Fructose | 38.190 | 46.200 |
| Dextrose | 31.280 | 37.705 |
| Sucrose | 1.310 | 1.582 |
| Maltose | 7.310 | 8.828 |
| Higher saccharides | 1.500 | 1.810 |
| Ash | 0.169 | 0.204 |
| Nitrogen | 0.041 | 0.050 |
| Undetermined | 3.000 | 3.621 |
| Total | 100.000 | 100.000 |

The ungelatinized starch employed in the process is preferably wheat starch which has a gelatinization temperature around 160° F. Other examples of suitable starches are corn and rice starch. Wheat starch and rice starch are superior to corn starch because they are bland in flavor, whereas corn starch carries a definite flavor characteristic which it imparts to the finished dried product.

Modified grain starches of the types indicated above may be usable provided that the temperature required for gelatinization is not lower than 150° F. Wheat flour, corn flour, and rice flour are all usable materials in place of the corresponding extracted starches. However, the flavor of the flour in each case is definitely stronger than that of the extracted starch. Therefore, although the flours can be used from a technical standpoint, they are not very feasible for use from a commercial standpoint relative to the taste of the finished dried product.

Root starches such as tapioca and potato are not very successful; in fact, they are almost impossible to use because of their lower gelatinization temperature thereby providing the possibility for too much gelatinization during the drying step.

In order to prepare the coating powder, the sugary syrup must be dehydrated in the presence of the ungelatinized starch. Optimum results are obtained by intimately mixing the sugary syrup with the ungelatinized starch to form a slurry, heating said slurry at a temperature 15° to 30° below the gelatinization temperature of the starch until the starch is conditioned to the extent that it will only partially gelatinize when subsequently heated above the gelatinization temperature, and subsequently heating said slurry above said gelatinization temperature to dehydrate said slurry and to partially gelatinize said starch, the quantity of said starch and the degree of gelatinization being sufficient to give a product which when ground forms a dry appearing flowable powder, free of gummy, sticky and lumpy characteristics. For the purpose of the invention, said powder usually comprises 40 to 80 parts by weight sugary syrup solids consisting essentially of monosaccharides, or both monosaccharides and disaccharides, and not more than 40% by weight as higher saccharides, and 60 to 20 parts by weight partially gelatinized starch of a type having a gelatinization temperature of at least 150° F., together with 0.5 to 4.0 parts by weight water, 0–1 part by weight emulsifier, and 0–1 part by weight antihumectant.

The emulsifier is an optional ingredient added to facilitate deaeration during drying and the amount used is usually within the range of 0.2–0.8%. Emulsifiers contain both hydrophile and hydrophobe groups and are effective in causing the release of entrapped air. The deaeration which occurs can be observed by examination of the slurry under a microscope. A preferred deaerator is hydroxylated lecithin. Other suitable emulsifiers are glycerol mono- and distearate or any of the polyoxyethylated emulsifiers normally used in making bread and other bakery products.

Where the coating powders are to be stored over long periods of time it is sometimes desirable to add an antihumectant, usually in amounts not exceeding 1% by weight of the product, preferably 0.5% to 1%. Examples of antihumectants are calcium stearate, micronized silica, tricalcium phosphate and magnesium carbonate. The antihumectant can be mixed with the product during grinding. A preferred antihumectant is calcium stearate.

Dehydrated sugary syrup-gelatinized starch compositions suitable for the practice of the invention are available commercially under the names "Honi-Bake" and "Dri-Mol," the former containing dehydrated honey with or without high fructose corn syrup, and the latter dehydrated molasses. These compositions have been used heretofore principally in making bakery products. It seems apparent that the dehydration of a sugary syrup of the type described in the presence of a starch of the type described results in some interaction and a modification of the chemical structure whereby when the resultant powders are used for coating meat, results are obtained which cannot be duplicated by merely using a liquid sugary syrup plus a starch.

When these coating powders are applied to the surface of a variety of meat products or are included in the formula for making comminuted meat products, the resulting meat products, upon being heat-processed for eating, have a more soft texture and an improved flavor. The softness and texture result from the retention of more of the meat juice due to the presence of the dried sugar compositions. Since more of the juice, that is, natural tissue water and fat, is retained in the meat product, the meat unit does not shrink as much with fried, broiled, or baked. This texture improvement, reduction in shrinkage and retention of meat juices result in a very significant improvement in the cooked meat products.

In addition to these physical differences, such treated meat products have more flavor. Sweetness is of course added. Along with this, however, is the delectable honey characteristic in the case of the dehydrated honey syrup product, or a molasses taste with the dried molasses syrup product. In fact, beef products such as hamburger containing the dehydrated molasses take on a simulated charcoal taste.

The application of these coating powders covers a very wide range of meat products. These applications can be classified into two major divisions. The first is coating on meat units, that is, integral pieces of animal muscle and comminuted animal muscle products such as sausage. The second major division is treatment in comminuted meat products such as sausage, hamburger, and meat loaves. The broad effects on both applications are the same as described above.

Each category includes meat from all of the usual commercial sources. This ebraces beef, pork, lamb, chicken, and fish. It must be understood that in lamb, the invention also encompasses other types of this same kind of meat, that is, mutton. Similarly, in the category of beef is included veal, which is really another designation for meat derived from a younger beef animal.

The meat varieties also include certain processed meats such as ham, which is subjected to a smoking operation, as are many but not most of sausages. In this case, the coating powders are applied to the raw ham prior to its initial heat processing. Also in the concept of the invention is the application of the coating powders to slices of such previously heat-processed ham involving a step of frying or otherwise heating the slices of ham after they have been coated with the coating powders.

In general, the coating powders can be applied either to the outside surfaces of meat units or they can be mixed with comminuted meats.

Examples of meat products where the coating powder is applied to the outside surface are the following.

TABLE I

A. Beef products
   (a) beef cutlets—steaks, chops, and integral pieces of beef muscle
   (b) comminuted beef products—hamburger in patty form and meat loaves
B. Pork products
   (a) cutlets, chops, and integral pieces of pork muscle
   (b) comminuted pork products which includes sausage in natural casings, cellulose casings, collagen casings, and any other artificial edible casings. It also includes pork product patties. Further included are molded and extruded comminuted pork products but which are not enclosed in casings of any kind
C. Hams
D. Ham slices
E. Combinations of pork and beef muscle in comminuted form such as sausage, meat loaves, and other varieties of combined products
F. Fowl, which includes chicken, turkeys, ducks, geese, pheasant, and other varieties of fowl commercially available
G. Fish fillets and comminuted extruded fish products such as fish sticks Examples of the application of the coating powders in the comminuted meats are the following.

TABLE II

A. Beef products in comminuted form such as hamburger formed into patties or other units which are fried or broiled

TABLE II—Continued

B. Meat loaves—units which are larger than those units covered under II-A and which are baked rather than fried or broiled. In this instance, the heat treatment is less intense but is carried out for a longer period of time
C. Pork sausage extruded into casings enumerated above or formed into patties, all of which are coated with the coating powders
D. Comminuted lamb or mutton products formed into patties or extruded
E. Chicken patties—comminuted chicken meat formed into patties or other forms of chicken units
F. Fish products which are comminuted and formed into various shapes such as patties or molded bars or sticks.

The amount of the coating powder which is added to the meat products can be varied depending upon the type of meat product, i.e., whether it is an integral meat unit or a comminuted meat product, but is usually within the range of 1.0% to 10%. The optimum level is usually around 3.5%. The amount can be varied by varying the moisture content of the surface of the meat product. The upper limit of the amount of coating powder added to the meat product is not critical and amounts greater than 10% can be added but are usually not necessary to afford reduction of shrinkage and retention of juices.

EVALUATION OF THE INVENTION

In order to evaluate the invention tests were carried out with the application of dehydrated honey-starch powders and dehydrated molasses-starch powders to pork sausages prepared or stuffed in artificial casings. The amount of the powder taken up by the pork sausage unit can vary depending upon the moistness of the surface of the pork sausage units. In one method of application the coating powder was applied to the surface of the meat units so that adherence depended upon the amount of moisture naturally present on said surface. In a second method of application the surface of the meat unit was premoistened.

In applying the coating powder to the exterior surface of sausages, chops, cutlets and so forth, the surface of the meat units was merely dusted with the coating powder. In the laboratory this was performed by rolling sausage units, for example, on a layer of the dried coating powder resting on a table top. Commercially this can be accomplished by having the meat units travel down a conveyor with the coating powder being dusted thereon. At some points the meat units are turned over if they are steaks or cutlets so that both surfaces will be properly dusted. If the units are sausages, a similar conveying system can be used embodying the additional concept of rolling the sausages through a bed of the coating powder.

In a second method of application the coating powders were mixed with comminuted meat products to effect a uniform mixture. The coating powders can also be added to larger meat pieces as they are going through the grinder.

The invention will be further illustrated but is not limited by the following examples in which the quantities are by weight unless otherwise indicated.

In these examples "dehydrated honey" used was a powder composition prepared by dehydrating a sugary syrup in the presence of wheat starch and containing approximately 42% by weight honey solids, 34% by weight high fructose corn syrup solids, 22% by weight starch, 1% by weight hydroxylated lecithin and 1% by weight calcium stearate. The "dehydrated molasses" referred to in the examples consisted essentially of a powder obtained by dehydrating molasses mixed with wheat starch and containing approximately 66% solids from the molasses and 32% solids from the wheat starch, together with about 1% hydroxylated lecithin and 1% calcium stearate.

In Example I pork sausages were used and were coated by two methods. In one method the coating powder was placed on a flat surface and the sausages were rolled in the powder. In the second method the coating powder was placed in a paper bag. The sausages were dropped into the bag, the bag was then closed and shaken.

In Example II cutlets, chops, steaks and fillets were coated by dipping the meat unit in a quantity of the "dehydrated honey" or "dehydrated molasses."

The meat units in all cases were broiled in a standard kitchen oven. Each lot was cooked on a separate pan. Treated units were always cooked at the same time with untreated meat units, thereby maintaining total temperature uniformity. In making meat loaves (Example III) a laboratory baking oven was used wherein excellent temperature control was maintained at all times.

Data was collected on weight losses, liquid losses and texture tenderness. Texture tenderness of the cooked meat was measured by a panel of three people. Tenderness was rated against a perfect score of 100.

EXAMPLE I

| | Average weight—5 sausage links | | | Percent loss in— | | | Texture tenderness score of cooked sausage |
|---|---|---|---|---|---|---|---|
| | Initial, g. | After cooking, g. | Liquid loss, cc. | Weight | Size | Liquid | |
| Brand OM: | | | | | | | |
| 1. No treatment | 158.7 | 85.0 | 49 | 46.4 | 24.8 | 30.9 | 65 |
| 2. Coated by rolling in dehydrated honey | 170.2 | 103.5 | 36 | 39.2 | 21.2 | 21.1 | 70 |
| 3. Coated by rolling in dehydrated molasses | 177.0 | 109.0 | 36 | 38.4 | 21.1 | 20.3 | 75 |
| Brand J: | | | | | | | |
| 4. No treatment | 151.0 | 113.4 | 17 | 24.9 | 8.7 | 11.3 | 70 |
| 5. Coated by rolling in dehydrated honey | 162.0 | 124.8 | 10 | 22.9 | 6.9 | 6.2 | 75 |
| Brand OM: | | | | | | | |
| 6. No treatment | 164.5 | 89.3 | 53 | 45.7 | 23.4 | 32.0 | 65 |
| 7. Coated by shaking in dehydrated honey | 177.5 | 101.9 | 44 | 42.6 | 22.1 | 24.8 | 70 |
| Brand J: | | | | | | | |
| 8. No treatment | 149.3 | 96.0 | 29 | 35.7 | 11.3 | 19.4 | 60 |
| 9. Coated by shaking in dehydrated honey | 162.1 | 112.5 | 21 | 30.6 | 7.3 | 13.0 | 65 |
| Brand OM: | | | | | | | |
| 10. No treatment | 121.4 | 55.9 | 36 | 54.0 | 27.7 | 29.6 | 60 |
| 11. Coated by rolling in dehydrated honey | 128.2 | 67.9 | 32 | 47.0 | 25.5 | 25.0 | 75 |
| 12. Surface moistened with water; coated with dehydrated honey | 134.4 | 79.5 | 30 | 40.9 | 33.8 | 22.3 | 70 |

Experimental work determined that the average gain in weight of Brand OM pork sausages by coating by various methods was greatest when the sausage was moistened and rolled in the coating powder.

Average percent weight gain
1. Rolling in dehydrated honey _____ 3.58
2. Shaking in dehydrated honey _____ 2.35
3. Moistening, then rolling in dehydrated honey ___ 5.88

The data of Example I indicate the relationship of lower weight loss and less shrinkage when the sausages are more heavily coated with the coating powder. This happens when the sausages are rolled in the coating powder and when premoistened followed by rolling.

EXAMPLE II

|  | Loss in (percent) | | Texture tenderness score of cooked meat |
|---|---|---|---|
|  | Weight | Liquid |  |
| 1. Pork chops, untreated | 32.9 | 4.71 | 60 |
| 2. Pork chops coated with dehydrated honey | 30.63 | 2.81 | 85 |
| 3. Pork chops coated with dehydrated molasses | 25.79 | 1.26 | 80 |
| 4. Sirloin steak, untreated | 23.77 | Not measurable. | 60 |
| 5. Sirloin steak coated with dehydrated honey | 16.74 | do | 75 |
| 6. Sirloin steak coated with dehydrated molasses | 16.1 | do | 90 |
| 7. Ham slices untreated | 16.54 | do | 60 |
| 8. Ham slices coated with dehydrated honey | 12.14 | do | 80 |
| 9. Perch fillets, untreated | 33.68 | do | 70 |
| 10. Perch fillets coated with dehydrated honey | 26.0 | do | 70 |
| 11. Perch fillets coated with dehydrated molasses | 22.8 | do | 85 |
| 12. Fish sticks, untreated | 12.8 | do | 70 |
| 13. Fish sticks coated with dehydrated molasses | 9.8 | do | 85 |
| 14. Chicken, untreated | 30.9 | do | 60 |
| 15. Chicken coated with dehydrated honey | 26.3 | do | 85 |

EXAMPLE III

Experiments were made in which the coating powders were added to comminuted beef products (hamburgers and meat loaves). Treatment consisted of adding in each case 0.6% salt and 3.5% of the coating powder. This was well mixed. Hamburger patties were formed in a commercial-type mold. Meat loaves were shaped by hand using a standard volume of meat in each case. Heat treatment was in a broiler for the hamburgers and in an electric oven for the meat loaves. In both cases, uniformity of temperature was closely maintained. Data were collected as for Examples I and II.

|  | Loss in— | | Texture tenderness score of cooked meat |
|---|---|---|---|
|  | Weight percent | Liquid, cc. |  |
| 1. Hamburger (round steak), untreated | 17.4 | Not measurable. | 50 |
| 2. Hamburger (round steak), treated with 3.5% dehydrated honey | 15.0 | do | 70 |
| 3. Meat loaf, untreated | 31.1 | 34 | 70 |
| 4. Meat loaf treated with 3.5% dehydrated honey | 27.7 | 24 | 80 |
| 5. Meat loaf treated with 3.5% dehydrated molasses | 28.3 | 24 | 85 |
| 6. Control meat loaf untreated | 30.9 | 69 | 45 |
| 7. Meat loaf treated with 10.0% dehydrated molasses | 18.3 | 40 | 85 |

EXAMPLE IV

Whole hams were coated with "dehydrated honey" and "dehydrated molasses" prior to baking. The surface of the ham was moistened, after which the coating powder was dusted on. For additional sweetness, brown sugar may be first mixed with the coating powder in a ratio of about 2 parts coating powder and 1 part brown sugar. Spices may also be added. The coated hams retained more juice during the baking process and were therefore more tender-textured than untreated hams.

The practice of the invention is also applicable to other types of meat products including wild fowl, wild animal meat such as venison, elk, moose, bear and rabbit meats.

The invention is hereby claimed as follows:

1. A process of preparing meat products to reduce shrinkage and loss of moisture and juices upon cooking which comprises coating a meat product with a powder consisting essentially of a dehydrated mixture of a sugary syrup in which the solids are mainly saccharides selected from the group consisting of monosaccharides and both monosaccharides and disaccharides, and not more than 40% by weight of said solids as higher saccharides, and a partially gelatinized starch of a type having a gelatinization temperature of at least 150° F., said dehydrated mixture being obtained by dehydrating said sugary syrup in the presence of an ungelatinized starch of said type, the resultant mixture containing 40 to 80 parts of said sugary syrup solids and 60 to 20 parts partially gelatinized starch, the quantity of said powder applied to said meat product being sufficient to reduce shrinkage and enhance retention of moisture and juices when said meat product is cooked, said quantity being within the range of 1% to 10% by weight of said meat product, and thereafter cooking the coated meat product.

2. A process as claimed in claim 1 in which said meat product comprises a comminuted meat.

3. A process as claimed in claim 1 in which said meat product comprises an integral meat unit.

4. A process as claimed in claim 1 in which said meat product is pork sausage.

5. A process as claimed in claim 1 in which said meat product is a ground beef patty.

6. A process as claimed in claim 1 in which said meat product is a frankfurter.

7. A meat product as prepared by the process of claim 1.

8. A meat product as prepared by the process of claim 1 in which the sugary solids of said powder comprises honey solids.

9. A meat product as prepared by the process of claim 1 in which the sugary solids of said powder comprises molasses solids.

10. A meat product as prepared by the process of claim 1 in which the sugary solid of said powder comprises both honey and high fructose corn syrup solids.

11. A meat product as prepared by the process of claim 1 in which said partially gelatinized starch is wheat starch.

References Cited
UNITED STATES PATENTS

| 2,635,963 | 4/1953 | Glabe | 99—108 |
| 3,216,827 | 11/1965 | Fetty | 99—108 |
| 3,514,294 | 5/1970 | Klug et al. | 99—169 X |
| 3,672,913 | 6/1972 | Podebradsky | 99—109 |

HYMAN LORD, Primary Examiner

U.S. Cl. X.R.

426—103, 289

UNITED STATES PATENT OFFICE
CERTIFICATE OF CORRECTION

Patent No. 3,792,173  Dated February 12, 1974

Inventor(s) ELMER F. GLABE

It is certified that error appears in the above-identified patent and that said Letters Patent are hereby corrected as shown below:

Column 2, in the table under the heading "Normal moisture basis" "38,190" should read --38.190--; "31,280" should read --31.280--; "1,310" should read --1.310--.

Column 2, in the table under the heading "Solids calculated to a dry basis", "1,582" should read --1.582--; "8,828" should read --8.828--.

Column 3, line 74, "with" should read --when--.

Column 4, line 22, "ebraces" should read --embraces--.

Column 6, line 13, "soldis" should read --solids--.

Column 7, Example II, No. 7, "Han" should read --Ham--.

Column 7, in the table in Example III, under the heading "Texture tenderness score of cooked meat", the fourth numeral down "80" should read --85--; the seventh numeral down "85" should read --80--.

Signed and sealed this 3rd day of December 1974.

(SEAL)
Attest:

McCOY M. GIBSON JR.
Attesting Officer

C. MARSHALL DANN
Commissioner of Patents